Figures 4, 5:
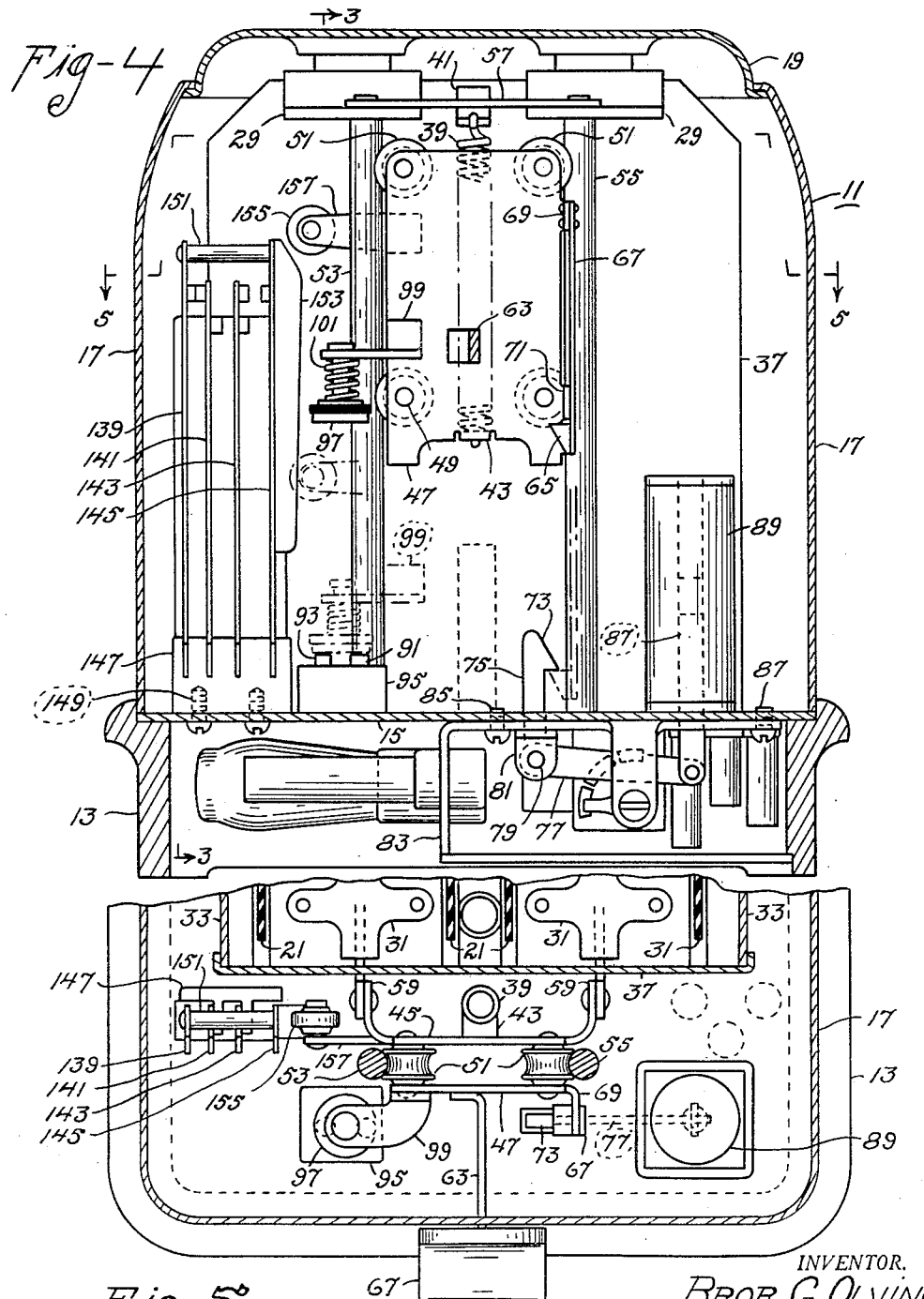

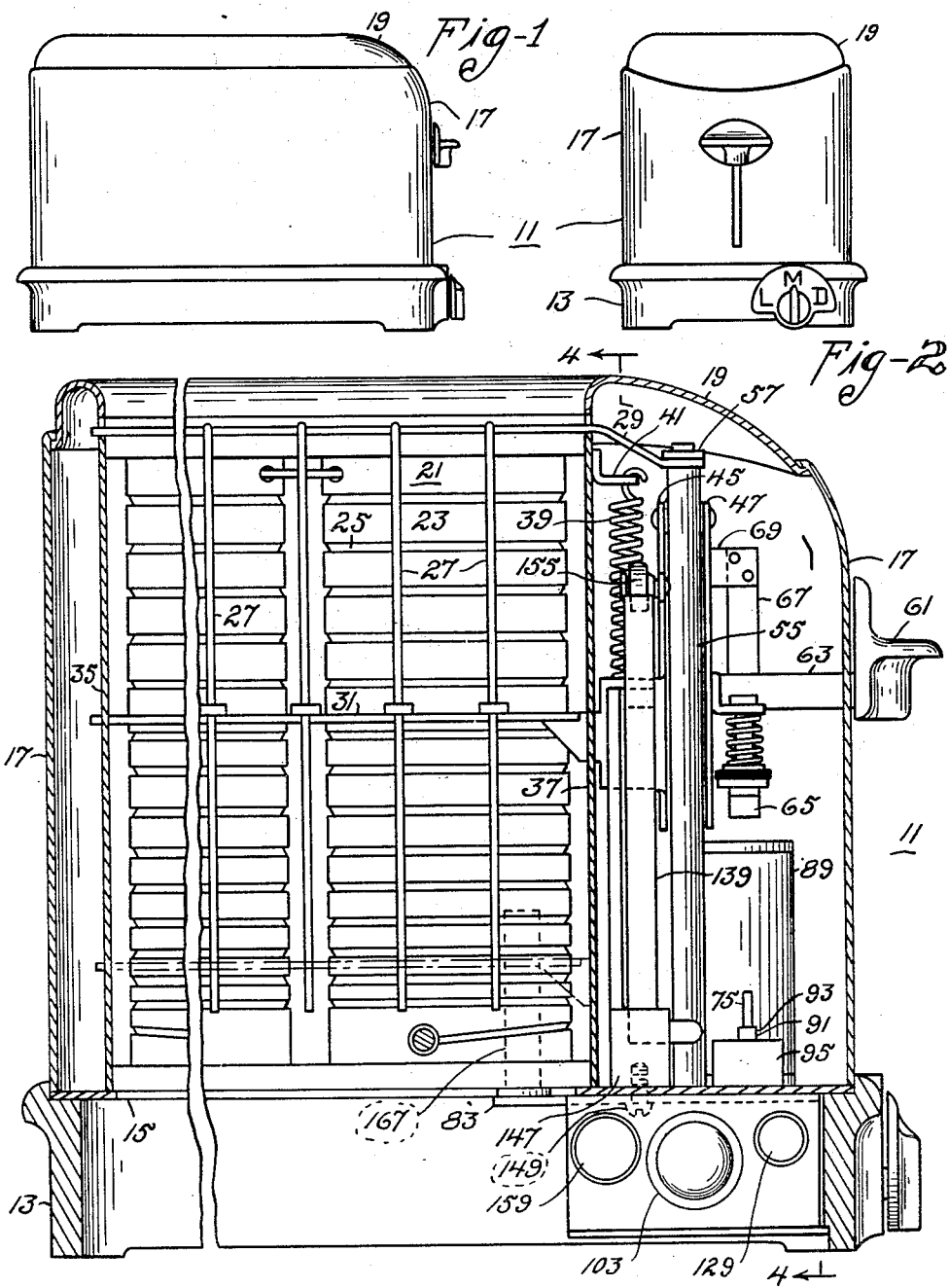

July 10, 1951 — B. G. OLVING — 2,560,389
AUTOMATIC ELECTRIC TOASTER
Filed March 2, 1945 — 4 Sheets-Sheet 2

INVENTOR.
BROR G. OLVING
BY

INVENTOR.
BROR G. OLVING
BY

INVENTOR.
BROR G. OLVING

Patented July 10, 1951

2,560,389

UNITED STATES PATENT OFFICE 2,560,389

AUTOMATIC ELECTRIC TOASTER

Bror G. Olving, Elgin, Ill., assignor to McGraw Electric Company, Elgin, Ill., a corporation of Delaware Application March 2, 1945, Serial No. 580,675

7 Claims. (Cl. 219—19)

My invention relates to electric toasters and particularly to timing circuits for such toasters.

An object of my invention is to provide a timing means and an electric circuit therefor which are dependable and will stand up in service for a relatively long time of use.

Another object of my invention is to provide a timing means, the performance of which depends upon the inherent electrical characteristics of its component parts and the operation of which is not dependent on or controlled by any energy supplied from mechanical or thermal storage devices.

Another object of my invention is to provide a timing means and an electric circuit therefor including an electron tube to obtain the above-mentioned operation.

Another object of my invention is to provide an electric circuit comprising an electron tube as well as means for charging an electrostatic condenser as soon as a connecting plug is connected across a supply circuit, which condenser shall discharge gradually and cause firing of said electron tube at a predetermined minimum voltage, to cause termination of a toasting operation.

Other objects of my invention will either be apparent from a description of one form of circuit embodying my invention or will be pointed out in the course of such description and set forth particularly in the appended claims.

Figures 6, 7:
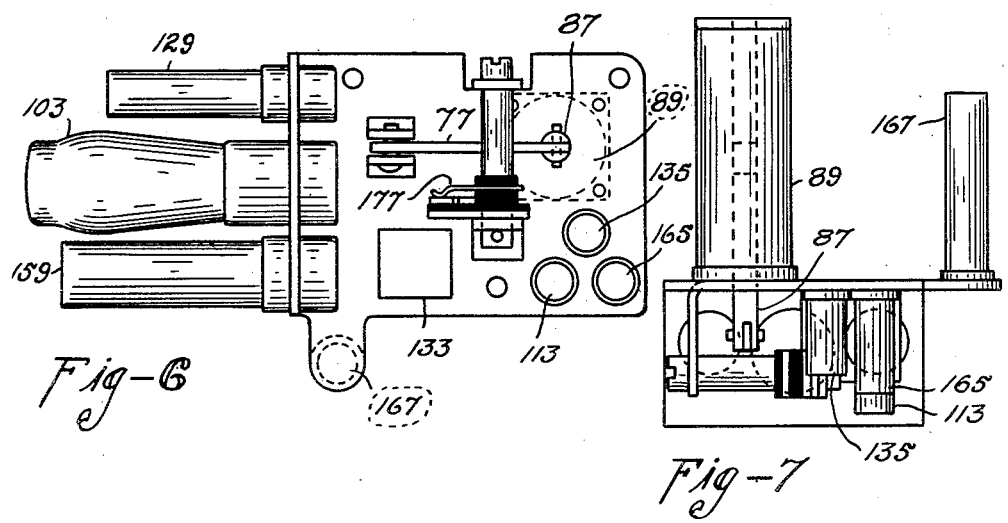
Figure 8:
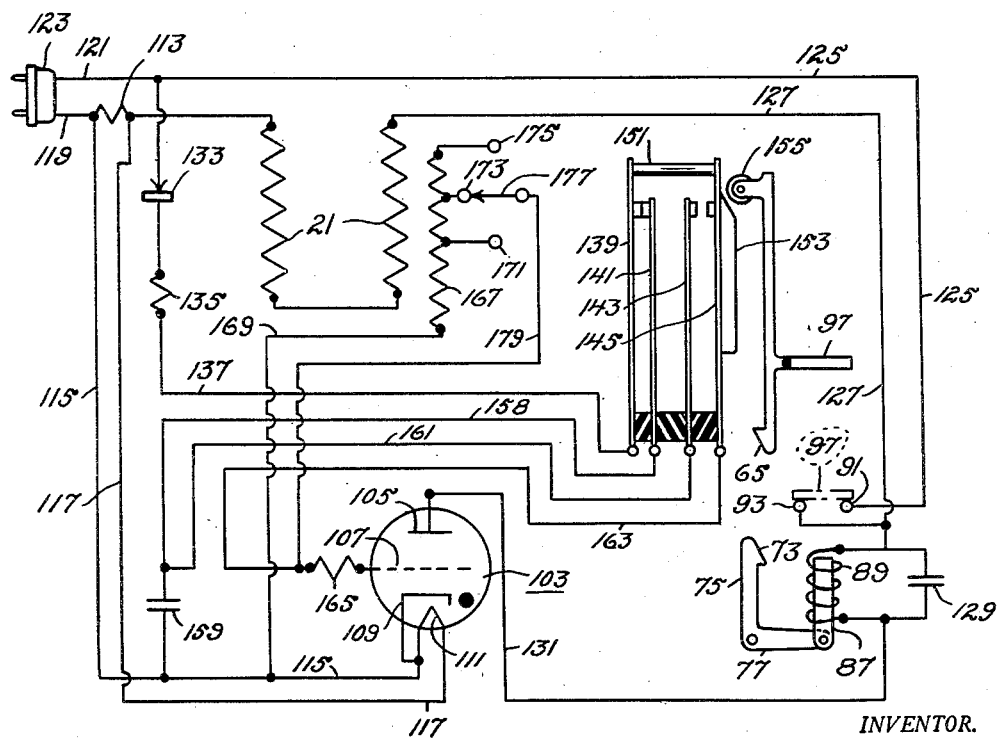
Figure 9:
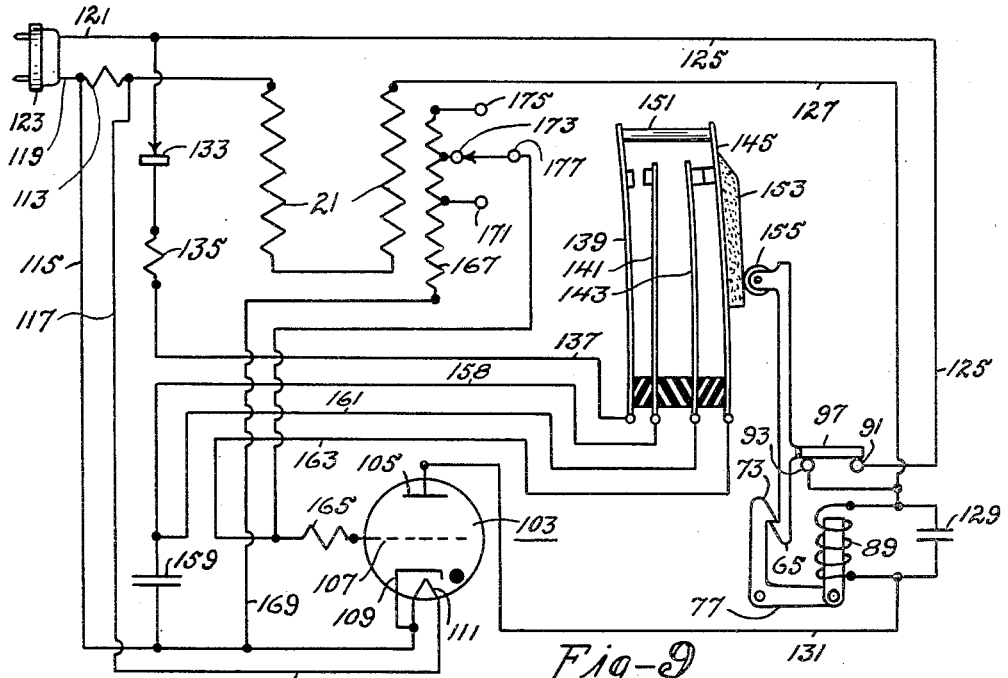
Figure 10:
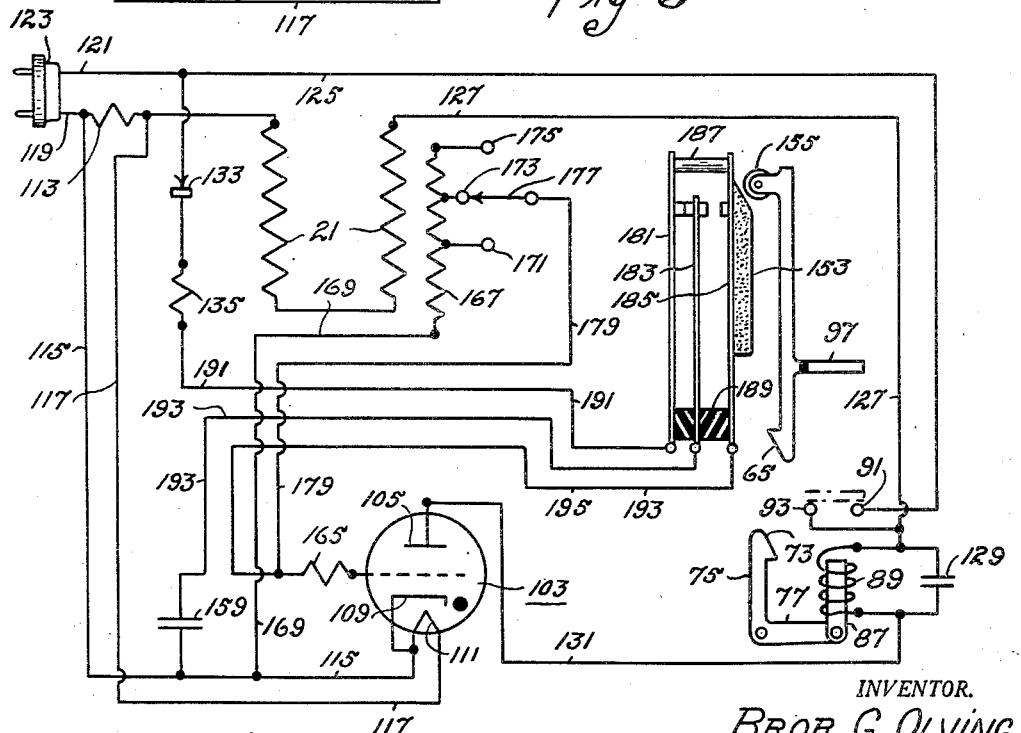

In the drawings,

Figure 1 is a side elevational view of a toaster embodying my invention,

Fig. 2 is a front elevational view thereof, both Figs. 1 and 2 being shown on a reduced scale, Fig. 3 is a vertical, longitudinal, sectional view taken on the line 3—3 of Fig. 4, Fig. 4 is a vertical, lateral, sectional view taken on the line 4—4 of Fig. 3, Fig. 5 is a fragmentary, horizontal, sectional view taken on the line 5—5 of Fig. 4, Fig. 6 is a bottom view of the assembled timer means, Fig. 7 is an end view of the parts shown in Fig. 6, Fig. 8 is a diagram of connections embodying my invention, Fig. 9 is a diagram of connections substantially the same as shown in Fig. 8 except that the parts are shown in the positions they will occupy after start of a toasting operation, and, Fig. 10 is a modified diagram of connections embodying the invention.

Referring first of all to Figs. 1 to 7 inclusive, I have there shown a domestic two-slice toaster designated by numeral 11 which comprises a base frame 13 which may be made of molded composition material and which has positioned thereon a bottom plate 15 as well as an outer casing 17 which has a cover member 19 thereon.

I provide also pairs of electric toast heating elements 21 which extend substantially vertically from the bottom plate 15. Each element 21 comprises one or more sheets 23 of thin electric-insulating material, such as mica, on which is wound a strip or strand 25 of suitable electric-resistance material. I provide also a plurality of vertical guard or guide wires 27 which may be suspended from horizontally extending frame plates 29 supported adjacent the upper end of the outer casing 17.

I provide also bread carriers 31 positioned in each of the toasting chambers which are constituted by one of the inner toast heating elements 21 as well as an outer baffle plate 33. I provide also a rear intermediate wall 35 as well as a front intermediate wall 37, the front and rear intermediate walls cooperating with the inner toast heating element 21 and the outer baffle plate to provide a toasting chamber.

Since it is desired that the bread carriers shall be vertically movable in their respective toasting chambers from their upper non-toasting position to a lower toasting position and that they shall be normally yieldingly biased into their upper non-toasting position, I provide a tension coil spring 39 having its upper end secured to a bracket 41 which is secured against the front surface of the front intermediate wall 37. The lower end of tension coil 39 is secured to a lug 43 constituting a part of a rear carriage plate 45. I provide a front carriage plate 47 and space it apart from the rear carriage plate as by a plurality of headed studs 49, and on each of the four studs, I mount an externally grooved roller 51. The studs 49 are positioned adjacent the four corners of the substantially rectangularly shaped rear and front carriage plates 45 and 47. The grooved rollers 51 are adapted to engage the inner surfaces of vertically extending rods 53 and 55, the lower ends of which are secured to plate 15 while the upper ends thereof interfit with the front end portions of the top frame plates 29, a cross bar 57 being provided to hold the front end portions of the top frame plates 29 in proper and desired operative positions. It is to be understood that the rear end portions of the bread carriers 31 extend through vertical slots in the rear intermediate wall 35 while their front end portions extend through vertical slots in the front intermediate wall 37 and are secured to rearwardly extending lugs 59 of the rear carriage plate 45. The provision of the spring 39, therefore, normally yieldingly biases the bread carriers into their upper or non-toasting position from which position they will be moved downwardly into their lowermost or toasting positions by means of a knob 61 secured on the front outer end portion of a bar 63 which is secured against the front surface of the front carriage plate 47. All of the parts hereinbefore described are old and well known in the art and constitute no part of my present invention.

Means for holding the bread carriers in their lowermost or non-toasting position after they have been moved into said position in the manner hereinbefore described, comprises a hook member 65 which is secured on the bottom end portion of a resilient bar 67, the upper end of which is secured against a forwardly extending lug 69 positioned adjacent the right hand upper end portion of front carriage plate 47 as seen in Fig. 4 of the drawings. The spring bar 67 is biased in a clockwise direction and is adapted to engage a stop lug 71 constituting a part of the front carriage plate 47. When the hook 65 is moved downwardly together with the bread carriers, it will engage a hook-shaped end portion 73 of a substantially vertically extending arm 75 which constitutes one part of an electromagnetically releasable latch comprising a bell crank lever comprising in addition to the vertical arm 75, a substantially horizontally extending arm 77 which is pivotally mounted on a pin 79 supported by a pair of lugs 81 which lugs are secured against the under surface of a bracket or bearing plate 83 which may be secured against the under surface of bottom plate 15 by machine screws 85. An electromagnetic armature core 87 is pivotally mounted on the outer end portion of the substantially horizontally extending arm 77 and is adapted to be energized by an armature coil 89.

Means for controlling the energization of the four toast heating elements 21 comprises a pair of fixed contacts 91 and 93 mounted on a block 95 of electric-insulating material, which is secured against the upper surface of bottom plate 15. A contact bridging member 97 is insulatedly yieldingly supported by a bracket 99 extending toward the left from the front carriage plate 47 as seen in Fig. 4 of the drawings, there being a coil spring 101 provided to insure good current conducting engagement between the contact bridging member 97 and the fixed contacts 91 and 93. It is to be understood that the position of the fixed contacts 91 and 93 on bottom plate 15 is such that they will be engaged by the contact bridging member 97 when the latter has been moved downwardly with the bread carriers.

Referring now to Figs. 8 and 9 of the drawings, I have there shown a diagram of connections of an electric circuit embodying my invention and comprising particularly an electron tube 103 which may be of the grid controlled rectifier type having a plate anode 105, a control grid 107, an indirectly heated cathode 109, and a heating filament 111. The tube is of the type which is electrically non-conducting when a relatively high negative biasing voltage is applied between the control grid 107 and the cathode 109, but which becomes conducting when the voltage thus applied has been decreased to a predetermined relatively low value.

The heated filament 111 is connected to the terminals of a small resistor 113 by means of conductors 115 and 117. Resistor 113 has such resistance that the filament 111 is energized to the proper degree when contact bridging member 97 engages contacts 91 and 93. Resistor 113 has one terminal connected to a first supply circuit conductor 119. A second supply circuit conductor 121 is also provided and these two conductors are connected to a connecting plug 123. Supply circuit conductor 121 is connected by a conductor 125 to fixed contact 91. The other terminal of resistor 113 is connected to one terminal of one of the toast heating elements 21 while the other terminal of this first heating element is connected to one terminal of a second toast heating element, the other terminal of which is connected by a conductor 127 to the second fixed contact 93.

Conductor 127 has one of its ends connected not only to fixed contact 93 but also to one terminal of the electromagnetic coil 89 as well as to one terminal of a small condenser 129 which is connected in shunt circuit relatively to the coil 89 so as to reduce chatter since the coil 89 will be traversed by alternating current at the time of termination of a toasting operation. The other terminal of coil 89 is connected by a conductor 131 to the plate anode 105. It will be noted that the indirectly heated cathode 109 is connected to conductor 115.

I provide a half-wave dry-type rectifier 133, one terminal of which is connected to conductor 121 while the other terminal thereof is connected to a small current limiting resistor 135. The ohmic value of the resistance of resistor 135 may be on the order of 50 ohms. The other terminal of resistor 135 is connected by a conductor 137 to one contact bar 139 of a twin switch bar assembly comprising in addition to the contact bar 139, contact bars 141, 143 and 145. These four contact bars are adapted to be supported by a block 147 of electric-insulating material which is secured against the upper surface of bottom plate 15 as by a plurality of short machine screws 149. The design construction and adjustment of the spring contact bars 139, 141, 143, and 145 is such that normally when knob 67 as well as the bread carriers themselves are in their upper or non-toasting positions, contact bars 139 and 141 are in electrical engagement with each other while contact bars 143 and 145 are out of engagement with each other. I provide further a spacing bar 151, of electric-insulating material, secured to the outer contact bars 139 and 145 which are longer than bars 141 and 143. Contact bar 145 has a cam surface 153 secured thereagainst, the right hand surface thereof as seen, for instance, in Fig. 4 of the drawings where it may be engaged by a roller 155 which is rotatably supported as by a bracket 157 which is secured against the rear carriage plate 45 and extends therefrom in a left hand direction as seen in Fig. 4 of the drawings where it can engage the right hand surface of cam plate 153 during the time when an operator moves knob 67 in a downwardly direction. The result of the engagement of roller 155 against cam surface 153 is that first of all disengagement of the two contact arms 139 and 141 is effected, after which engagement of contact arm 145 with arm 143 is effected and maintained during a toasting operation. During the upward or return movement of contact bridging member 97 at the termination of a toasting operation, the engagement between contact arms 145 and 143 which continued during the entire period of a toasting cycle, is interrupted after which contact bars 139 and 141 will again be moved into electrical contacting engagement with each other as soon as the roller 155 moves out of engagement with cam surface 153.

Contact arm 141 is connected by a conductor 158 to the upper terminal of a timing condenser 159, the lower terminal of which is connected to conductor 115, and the capacitance of which is on the order of about five microfarads.

The upper terminal of condenser 159 is also connected by a conductor 161 to contact bar 143. Contact bar 145 is connected by a conductor 163 to one terminal of a current limiting resistor 165, the ohmic resistance of which is on the order of 10,000 ohms and the other terminal of which is connected to control grid 107.

I provide further a timing resistor 167, the lower terminal of which is connected by a conductor 169 to conductor 115. Resistor 167 is provided with a plurality of taps having fixed contact members 171, 173 and 175 secured thereto which fixed contacts are adapted to be engaged by a manually-adjustable contact arm 177, which contact arm is connected by a conductor 179 to conductor 163.

Let it now be assumed that an operator has positioned connecting plug 123 in an energized socket having the proper supply circuit voltage. Under these conditions, that is, before he presses downwardly on knob 67, the rectifier 133 is energized through a circuit comprising supply circuit conductor 121, rectifier 133, resistor 135, conductor 137, engaged contact bars 139 and 141, conductor 158, timing condenser 159, and then through conductor 115 to the other energized supply circuit conductor 119. After the operator has placed one or two slices of bread on the carriers and has pressed downwardly on knob 67, the roller 155 will be moved downwardly into engagement with the contact surface of cam 153 whereby disengagement of contact bars 139 and 141 is first effected after which engagement of the normally disengaged contact bars 143 and 145 is effected as is shown in Fig. 9 of the drawings. This interrupts the charging circuit of condenser 159, which may be of a capacitance on the order of 5 microfarads and which is very quickly charged as soon as the connecting plug 123 was inserted in a connecting socket. Fig. 9 is intended to show the positions of the various contact bars 139, 141, 143 and 145 when the toast heating elements 21 are energized as they will be during the toasting cycle.

Let it now be assumed that the manually-adjustable contact arm 177 is in engagement with the fixed contact 173 and that the ohmic resistance of timing resistor 167 is on the order of 5 megohms when the temperature of the resistor is at substantially ordinary room value. Then the timing condenser 159 will begin to discharge through the timing resistor with a resultant decrease in potential across the terminals of the timing condenser until after a period having a length on the order of 2½ to 3 minutes, the potential across the terminals of condenser 159 will have been decreased to a value which will cause firing of the tube 103 with a resultant current flow therethrough through a circuit substantially as follows: from supply circuit conductor 121, through conductor 125, through closed switch contacts 91 and 93, through coil 89, conductor 131 to plate anode 105, to the cathode 109, and then through conductor 115 to the other supply circuit conductor 119. This will cause quick upward movement of the armature core 87 with the result of causing disengagement of hook member 73 from hook 65 and quick upward movement of the bread carriage 31 into their upper or non-toasting positions.

As has already been hereinbefore set forth, the upward movement of roller 155 with the bread carriers restores the circuit to the positions of the contact bars 139 and 141, and 143 and 145 as shown in Fig. 8 of the drawings which will cause recharging of the timing condenser 159 to approximately the peak voltage of the supply circuit so that the entire toaster structure is ready for a quickly succeeding second operation.

The timing resistor 167 has a negative temperature coefficient of resistance, that is, its resistance decreases with an increase of temperature of the resistor and the amount of decrease is suitably effected so that upon a quickly succeeding toasting operation, the decrease in resistance is such that the discharge of the timing condenser 159 is greater during a given period of time, that is, it will require a shorter length of time to discharge the condenser 159 to that potential which will cause firing of the tube 103 in a period of time such that substantially the same degree of toasting will be effected by the hotter toaster structure, in a manner now well understood. The same comments will hold for any successive toasting operation and with proper correlation of the temperature coefficient of resistance of the timing resistor 167 and the characteristics of the timing condenser 159 as well as of the electron tube 103, will result in substantially the same degree of toasting irrespective of temperature variations of the toaster structure.

It was hereinbefore assumed that when arm 177 was in engagement with contact 173 that a medium piece of toast would result and if an operator should desire, say, a light piece of toast, all that would be necessary would be that he move contact arm 177 into engagement with contact 171 to thereby include a smaller amount of the timing resistor in the discharge circuit of the timing condenser 159. This would result in a decreased length of cycle of a toasting operation with the result that the slice or slices of bread would be toasted to a lesser degree, that is, say, to a "light" condition. Turning movement of contact arm 177 in a clockwise direction would cause a darker piece of toast to result because of the greater amount of resistance in the discharge circuit of timing condenser 159 whereby a slice or slices of bread would be subject to the radiant heat from the toast heating elements 21 for a longer period of time.

Referring now to Fig. 10 of the drawings, I have there illustrated a modified diagram of connections in which the hereinbefore-mentioned four contact bars are replaced by three contact bars 181, 183 and 185. Contact bar 185 has a cam surface 153 secured thereagainst, which cam surface is adapted to be engaged by a roller 155 all as hereinbefore described. I provide further an electric-insulating spacer 187 secured between the upper ends of the longer contact bars 181 and 185. The contact bars 181, 183 and 185 are mounted as on a block 189 of electric-insulating material having three slots extending therein instead of the four-slot block 147 hereinbefore described. Contact bars 181 and 183 are normally in electric-contacting engagement while contact bars 183 and 185 are normally out of engagement with each other.

A half-wave dry-type rectifier 133 has one terminal thereof connected to supply circuit conductor 121 while its other end is connected to one terminal of a current limiting resistor 135 having an ohmic resistance on the order of 50 ohms. The other terminal of resistor 135 is connected by a conductor 191 to contact bar 181 while contact bar 183 is connected by a conductor 193 to the upper terminal of timing condenser 159, the lower terminal of which is connected to conductor 115. Contact bar 185 is connected by a conductor 195 to conductor 179, and to the left hand terminal of a current-limiting resistor 165.

All of the other connections are substantially the same as have already been hereinbefore set forth in connection with the diagrams of Figs. 8 and 9.

It is evident that as soon as connecting plug 123 is applied to a connecting socket, that the rectifier 133 will cause energization for charging of the timing condenser 159 through the closed contact bars 181 and 183. As soon as an operator presses downwardly on knob 67, roller 155 will engage the surface of cam 153 causing disengagement of contact bars 181 and 183 after which contact bars 183 and 185 will be moved into engagement with each other whereby timing condenser 159 will start to discharge through timing resistor 167 with an attendant decrease of potential across its terminals. When the potential across the terminals of condenser 159 has reached a value sufficiently low to cause firing of tube 103, the tube will fire and substantially the same circuit is available for current flow through the tube 103 and coil 89 as also hereinbefore set forth in connection with diagrams shown in Figs. 8 and 9.

Substantially the same comments as hereinbefore made in connection with Figs. 8 and 9 apply also equally well to Fig. 10 as regards the compensation for temperature increase of the toaster structure resulting from quickly successive toasting operations as well as to meet the demands for different degrees of toasting.

It may be here pointed out that the diagram of connection shown in Figs. 8, 9 and 10 is such as to compensate also for relatively very high supply circuit voltage or relatively very low supply circuit voltage. Thus, if heaters 21 are energized from a circuit, the voltage of which is on the order of 120 volts, the temperature of the radiant heat will be much higher than it is at, say, 110 or even at 115 volts, with the result that the temperature rise of the timing resistor 167 which is either subject to radiant heat from the toast heating elements 21 or is subjected to the temperature of a toasting chamber will be increased with an attendant greater decrease of the resistance in the discharge circuit of tube 159 which will result in substantially the same degree of toasting irrespective of variations of the voltage supply circuit.

While I have illustrated two different systems depending upon the use of an alternating current source of supply, I am not limited thereto since if a direct current source of supply only is available, I may omit the rectifier 133 and can obtain substantially the same operation on a direct current source of supply of electric energy.

Various modifications may be made in the system embodying my invention without departing from the spirit and scope thereof, and all such modifications coming clearly within the scope of the appended claims shall be considered a part of my invention.

I claim as my invention:

1. In an automatic electric toaster the combination with electric toast heating elements, a connecting plug electrically connected to said heating elements and means for starting a toasting operation, of means for timing a toasting operation comprising a normally non-conducting electron tube which becomes conducting at a predetermined low potential, a timing condenser, a timing resistor connected in parallel electric circuit with said condenser and said tube and means comprising a normally closed switch for causing said condenser to be fully charged as soon as the connecting plug is connected to a supply circuit, and until said toast heating elements are energized by said starting means.

2. In an automatic electric toaster the combination with electric toast heating elements, a connecting plug electrically connected to said heating elements and means for starting a toasting operation, of means for timing a toasting operation comprising a normally non-conducting electron tube which becomes conducting at a predetermined low potential, a timing condenser, a timing resistor connected in parallel electric circuit with said condenser and said tube and means comprising a normally closed switch for causing said condenser to be fully charged, and to remain its fully charged condition when the connecting plug is connected across a supply circuit and until said toast heating elements are energized by said starting means.

3. In an automatic electric toaster the combination with electric toast heating elements, a connecting plug for said heating elements, a first switch for controlling the energization of said heating elements and means to cause closing of said first switch to start a toasting operation of means for timing a toasting operation comprising a normally non-conducting tube which becomes conducting at a predetermined low potential, a timing condenser, a timing resistor connectible in parallel electric circuit to said condenser and said tube, means comprising a normally closed second switch for causing said condenser to be fully charged when the connecting plug is connected across a supply circuit and means controlled by said first switch closing means for causing disconnection of said condenser from said charging means when said first switch is closed.

4. In an automatic electric toaster the combination with electric toast heating elements, a connecting plug for said heating elements, a first switch for controlling the energization of said heating elements and means to cause closing of said first switch to start a toasting operation, of means for timing a toasting operation comprising a normally non-conducting tube which becomes conducting at a predetermined low potential, a timing condenser, a timing resistor connectible in parallel electric circuit to said condenser and said tube, means comprising a normally closed second switch for causing said condenser to be fully charged when the connecting plug is connected across a supply circuit and means controlled by said first switch closing means for causing disconnection of said condenser from said charging means and for causing connection of said condenser in parallel electric circuit relation to said timing resistor and said tube when the heating element switch is closed.

5. In an automatic electric toaster the combination with electric toast heating elements, a connecting plug for said heating elements, a first switch for controlling the energization of said heating elements and means to cause closing of said first switch to start a toasting operation, of means for timing a toasting operation comprising a normally non-conducting tube which becomes conducting at a predetermined low potential, a timing condenser, a timing resistor connectible in parallel electric circuit to said condenser and said tube, means comprising a normally closed second switch for causing said condenser to be fully charged when the connecting plug is connected across a supply circuit and means controlled by said first switch closing means for causing disconnection of said condenser from said charging means and for causing connection of said condenser in parallel electric circuit relation to said timing resistor and said tube when the heating element switch is closed, said condenser then discharging through said timing resistor until its potential drops to the tube-firing value when the tube becomes conducting and is traversed by an electric current flowing through said connecting plug and means actuable by said current for causing termination of a toasting operation.

6. In an automatic toaster the combination with electric toast heating elements, a connecting plug for said heating elements, a first switch for controlling the energization of said heating elements and normally yieldingly biased into open position, a bread carrier movable into toasting and non-toasting positions relatively to said heating elements and normally yieldingly biased into non-toasting position, means for moving said first switch into closed position and said bread carrier into toasting position and electromagnetically-actuable latch means for holding said first switch in closed position and said bread carrier in toasting position, of means for timing a toasting operation comprising a normally non-conducting electron tube which becomes conducting at a predetermined low potential, a timing condenser, a timing resistor, means for causing charging of said condenser when said connecting plug is connected across a supply circuit, means actuable by said first switch and a carrier moving means for terminating the charging of said condenser and causing connection of said condenser in shunt circuit with said timing resistor and said tube to cause the potential of said condenser to be gradually reduced until it reaches a value at which said tube becomes conducting the current traversing said tube energizing said electromagnetic latch means to cause release thereof and termination of a toasting operation.

7. In an automatic toaster the combination with electric toast heating elements, a connecting plug for said heating elements, a normally open heating element control switch yieldingly biased into open position and movable means for causing closing of said control switch to start a toasting operation, means for timing a toasting operation comprising a normally non-conducting electron tube which becomes conducting when subject to a predetermined low potential, a timing condenser, means for causing said condenser to be fully charged from its charging circuit when said connecting plug is connected across an electric supply circuit, a timing resistor means actuable by said control switch closing means during its movement for disconnecting said condenser from its charging circuit and for causing connection of said condenser to said timing resistor and to the tube to cause gradual discharge of said condenser until its potential reaches a value at which said tube becomes conducting and means controlled by the current traversing said tube for terminating a toasting operation.

BROR G. OLVING.

REFERENCES CITED

The following references are of record in the file of this patent:

UNITED STATES PATENTS

| Number | Name | Date |
|---|---|---|
| 2,061,011 | Vingerhoets | Nov. 17, 1936 |
| 2,207,946 | Sardeson | July 16, 1940 |
| 2,317,228 | Shroyer | Apr. 20, 1943 |
| 2,364,998 | Palmer et al. | Dec. 12, 1944 |
| 2,451,508 | Olving | Oct. 19, 1948 |